(12) United States Patent  
Kim et al.

(10) Patent No.: US 8,054,800 B2
(45) Date of Patent: Nov. 8, 2011

(54) METHOD OF ESTABLISHING LINK FOR HANDOVER BY A MULTI-MODE MOBILE TERMINAL

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 468 days.

(21) Appl. No.: 11/403,041

(22) Filed: Apr. 11, 2006

(65) Prior Publication Data

US 2006/0265474 A1 Nov. 23, 2006

(30) Foreign Application Priority Data

Apr. 11, 2005 (KR) ........................ 10-2005-0030078

(51) Int. Cl.
*H04L 12/56* (2006.01)
*H04B 7/005* (2006.01)
(52) U.S. Cl. ......... 370/331; 455/437; 370/342; 370/335
(58) Field of Classification Search .................... 370/331
See application file for complete search history.

(56) References Cited

U.S. PATENT DOCUMENTS

| 7,251,227 | B2 * | 7/2007 | de Jong et al. ................ 370/331 |
| 7,394,761 | B2 * | 7/2008 | Foster et al. .................. 370/227 |
| 2003/0046437 | A1 * | 3/2003 | Eytchison et al. ............ 709/250 |
| 2004/0067754 | A1 * | 4/2004 | Gao et al. ..................... 455/442 |
| 2005/0003819 | A1 * | 1/2005 | Wu ............................... 455/436 |
| 2005/0014468 | A1 * | 1/2005 | Salokannel et al. ......... 455/41.2 |
| 2005/0068965 | A1 * | 3/2005 | Lin et al. .................. 370/395.21 |
| 2005/0237923 | A1 * | 10/2005 | Balakrishnan et al. ....... 370/208 |
| 2006/0056448 | A1 * | 3/2006 | Zaki et al. ..................... 370/466 |
| 2006/0092864 | A1 * | 5/2006 | Gupta et al. .................. 370/278 |
| 2006/0140150 | A1 * | 6/2006 | Olvera-Hernandez et al. ............................. 370/331 |

(Continued)

FOREIGN PATENT DOCUMENTS

WO WO 2004/008693 A1 1/2004

(Continued)

OTHER PUBLICATIONS

Koh, B. et al.: "Panasonic's MIH Proposal (Details)", IEEE 802.21 Working Group [online], Jan. 10, 2005 [retrieved on Sep. 7, 2007]. Retrieved from the Internet: <URL:http://www.ieee802.org/21/doctree/2005-01_meeting_docs/21-05-0206-00-0000-Panasonic_MIH_Proposal.ppt>. pp. 3, 9, 11.

(Continued)

*Primary Examiner* — Rafael Pérez-Gutiérrez
*Assistant Examiner* — Frank Donado
(74) *Attorney, Agent, or Firm* — Lee, Hong, Degerman, Kang & Waimey

(57) ABSTRACT

A method of performing a handover to at least one of a homogeneous and heterogeneous network is disclosed. More specifically, the method comprises establishing a heterogeneous network handover module for converging information from the at least one network interface module associated with the at least one of a homogeneous and heterogeneous network into a unified presentation. The method further comprises receiving a message for establishing connection by the at least one network interface module in a mobile terminal from the heterogeneous network handover module, performing link switch operation for establishing connection with an interface module in a network, and transmitting a confirmation message for indicating a link switch status to the heterogeneous network handover module.

23 Claims, 9 Drawing Sheets

U.S. PATENT DOCUMENTS

2006/0221899 A1* 10/2006 Feder et al. .................. 370/331
2006/0240825 A1* 10/2006 Funabiki et al. ............. 455/436
2006/0246904 A1* 11/2006 Olvera-Hernandez
   et al. ............................ 455/438

FOREIGN PATENT DOCUMENTS

WO   WO 2004/077867 A2   9/2004

OTHER PUBLICATIONS

Carlton, A. et al.: "Media Independent Handover Functions and Services Specification", IEEE 802.21 Working Group [online], Jan. 9, 2005 [retrieved on Sep. 7, 2007], Retrieved from the Internet:<URL:http://www.ieee802.org/21/doctree/2005-01__meeting_docs/21-05-0203-00-0000-InterDigital.doc>, XP002426057, pp. 5-13, 17, 35-74.

Gupta, V.G. et al.: "A Generalized Model for Link Layer Triggers", IEEE 802.21 Working Group [online], Mar. 1, 2004.

Mitani, K. et al.: "Unified L2 Abstractions for L3-Driven Fast Handover; draft-koki-mobopts-L2-abstractions-02.txt", IETF Standard-Working-Draft, Internet Engineering Task Force, IETF, CH, No. 2, Feb. 21, 2005.

S.M. Faccin et al., "Nokia MIH Proposal," IEEE 802.21 Media Independent Handover, Jan. 2004, XP-002617158.

* cited by examiner

METHOD OF ESTABLISHING LINK FOR HANDOVER BY A MULTI-MODE MOBILE TERMINAL

This application claims the benefit of Korean Application No. 10-2005-0030078, filed on Apr. 11, 2005, which is hereby incorporated by reference.

BACKGROUND OF THE INVENTION

1. Field of the Invention

The present invention relates to a method of establishing link, and more particularly, to a method of establishing link for handover by a multi-mode mobile terminal.

2. Discussion of the Related Art

In a IEEE 802.21, discussions related to a Media Independent Handover (MIH) are actively taking place. In particular, discussions related to providing seamless handover and service continuity between heterogeneous networks are increasing. Among the topics of discussions are function of the MIH, an Event Service (ES), Command Service (CS), and Information Service (IS).

A mobile terminal is multi modal which supports at least one interface type, and the interface types can be any one of the following. The interface types include a wire-line type similar an Ethernet of IEEE 802.3, a wireless interfaces based on IEEE 802.xx (e.g., 802.11, 802.15, 802.16), and an interface defined by a cellular standard organization (e.g., $3^{rd}$ Generation Partnership Program (3GPP), $3^{rd}$ Generation Partnership Program 2 (3GPP2)).

The MIH is defined between the IEEE 802 series interfaces or between the IEEE802 series interfaces and non-IEEE 802 series interfaces (e.g., 3GPP, 3GPP2). Furthermore, the MIH has to be supported by upper layer mobile support protocol such as a Mobile Internet Protocol (Mobile IP) and a Session Initiation Protocol (SIP) in order to provide seamless handover and uninterrupted service.

FIG. 1 illustrates a multi-mode mobile terminal. The mobile terminal comprises a wired Local Area Network (LAN), a wireless LAN, a broadband radio access network, and a cellular network. As illustrated in FIG. 1, the mobile terminal comprises a Physical (PHY) layer and a Medium Access Control (MAC) layer associated with each mode and has the MIH Function located below an Internet Protocol (IP) layer. The MIH function facilitates the handover process by using the input values from Layer 2 such as trigger event information and information of other networks. Moreover, the MIH Function can include input values (e.g., user policy and configuration) which can affect the handover procedure. In addition, general interfaces (e.g., the Mobile IP and the SIP) are defined between Layer 3 entities and the MIH Function. These interfaces provide information associated with Layer 1 (i.e., PHY Layer) and Layer 2 (i.e., MAC Layer) as well as mobility management. The MIH Function provides services to the upper layers through a single technology-independent interface and obtains services from the lower layers through a variety of technology-dependent interfaces. The MIH uses the ES and the IS to acquire information on lower layer and the network.

Furthermore, an upper management entity, located in the upper layer to monitor and control statuses of various links of the mobile terminal, is used to perform handover control function and device manager function. Here, the handover control function and the device manager can be independently located or can be included in the upper management entity. The terms upper layer and higher layer can be used interchangeably.

FIG. 2 illustrates a mobile terminal having a MIH Function and a network having a functional entity and transmission protocol. In FIG. 2, the dotted lines represent services such as a primitive and the ES. As illustrated in FIG. 2, the network layer uses the information from a link layer in order to quickly re-establish connection. The link layer event can be used to predict the user's movement and also can be used prepare for handover between the mobile terminal and the network. The trigger for handover procedure can be initiated from the PHY layer and the MAC layer. Moreover, the source of the trigger can be a local stack or a remote stack.

FIG. 3 illustrates an Event Service when performing handover to a new link. More specifically, FIG. 3 illustrates the ES related to establishing a new link due to decreased quality of the currently connected link.

A Command Service (CS) refers to the commands sent from the higher layers to the lower layers, including commands sent from the higher layers to the MIH or from the MIH to the lower layers. These commands are used to deliver higher layer decisions to lower layer as well as to control the activities of the lower layer entities.

An Information Service (IS) provides a framework by which a MIH Function both in the mobile terminal and in the network can discover and obtain network information within a geographical area to facilitate handovers. Here, the IS is accessible to any network. The IS includes the following information elements, such as a link access parameter, a security mechanism, a neighbor map, a location, a cost of link, and a provider and other access information.

When performing handover procedure in heterogeneous or homogeneous networks, referring to FIG. 3, the multi-mode mobile terminal first performs scanning to discover accessible link. Upon discovering the link to access, the mobile terminal delivers Link_Available trigger to the upper management entity and performs a link selection procedure to select one link from a plurality of accessible links. The upper management entity delivers the selected link to allow the MIH to establish connection with the corresponding link. However, according to the conventional trigger, the process of establishing connection with the selected link cannot be accomplished.

SUMMARY OF THE INVENTION

Accordingly, the present invention is directed to a [title] that substantially obviates one or more problems due to limitations and disadvantages of the related art.

An object of the present invention is to provide a method of performing a handover to at least one of a homogeneous and heterogeneous network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing a handover to at least one of a homogeneous and heterogeneous network comprises establishing a heterogeneous network handover module for converging information from the at least one network interface module associated with the at least one of a homogeneous and heterogeneous network into a unified presentation. The method further comprises receiving a message for establishing connection by the at least one network interface module in a mobile terminal from the heterogeneous network handover module, performing link switch operation for establishing connection with an interface module in a network, and transmitting a confirmation message for indicating a link switch status to the heterogeneous network handover module.

In another aspect of the present invention, a method of performing a handover to at least one of a homogeneous and heterogeneous network comprises establishing a heterogeneous network handover module for converging information from at least one network interface module associated with the at least one of a homogeneous and heterogeneous network into a unified presentation. The method further comprises receiving a command for establishing a connection from a management module by the heterogeneous network handover module, transmitting a message for establishing connection from the heterogeneous network handover module to the at least one network interface module in a mobile terminal, and receiving a confirmation message for indicating a link switch status from the at least one of the network interface module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
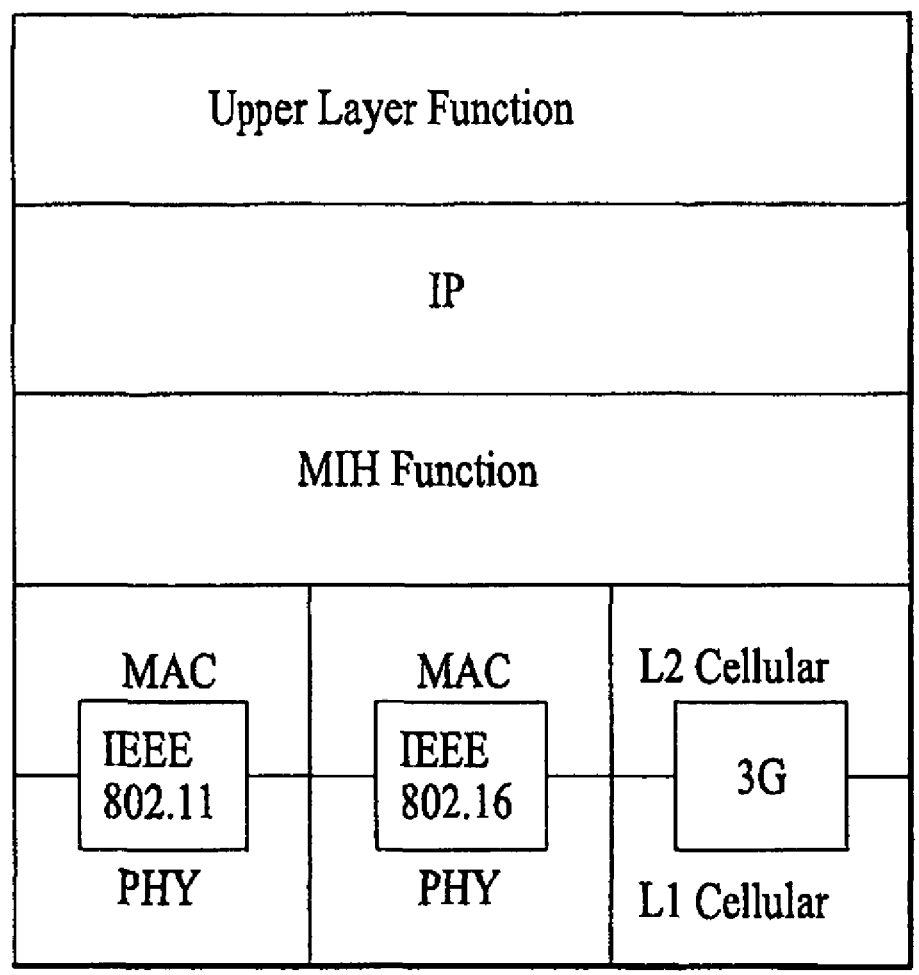
FIG. 1 illustrates a multi-mode mobile terminal.
Figure 2:
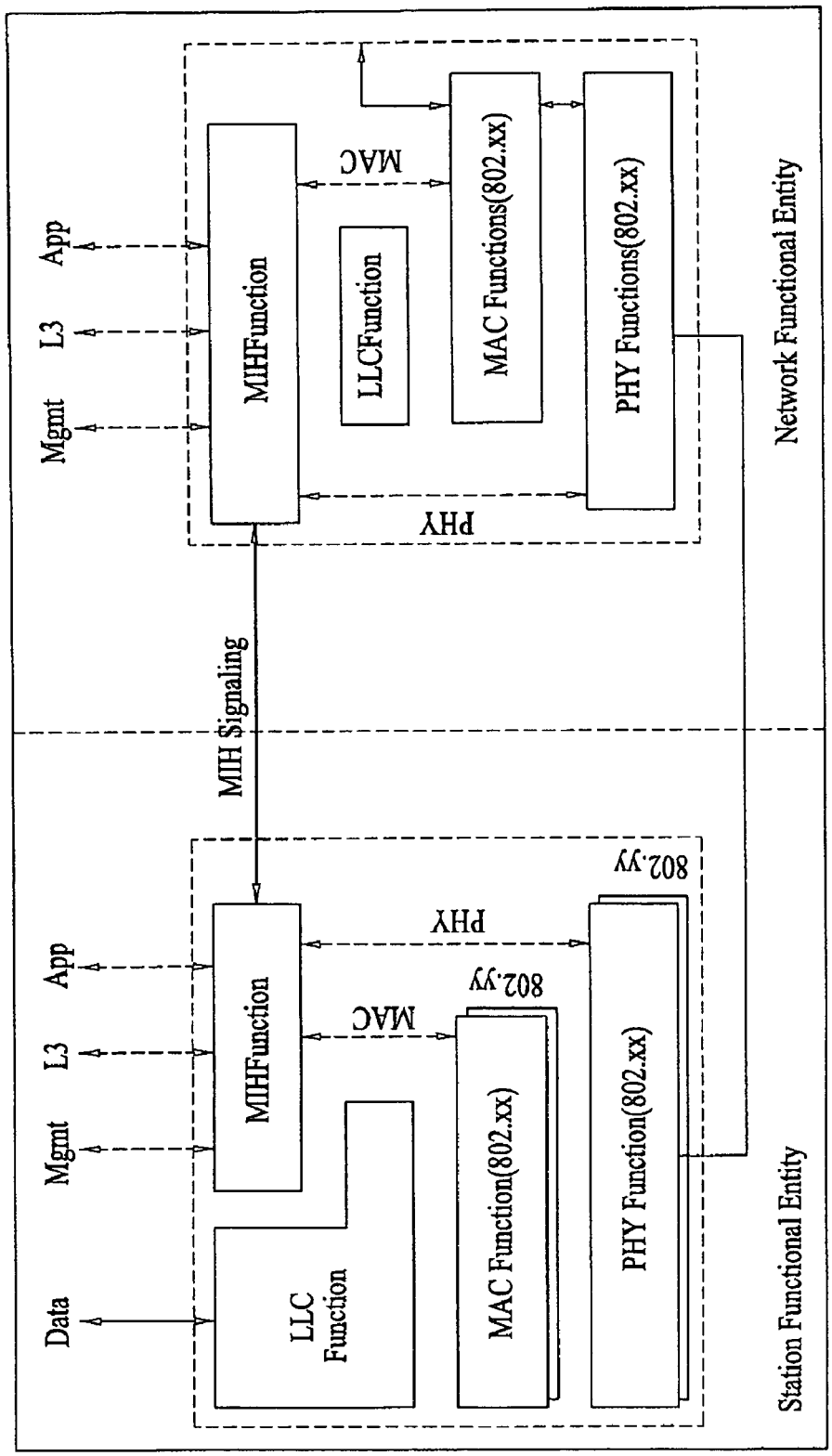
FIG. 2 illustrates a mobile terminal having a MIH Function and a network having a functional entity and transmission protocol.
Figure 3:
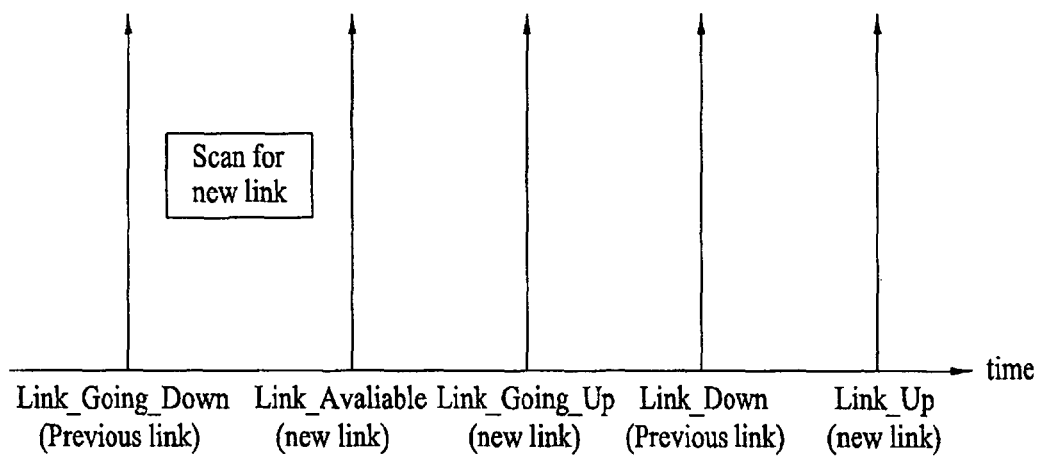
FIG. 3 illustrates an Event Service when performing handover to a new link.
Figure 4:
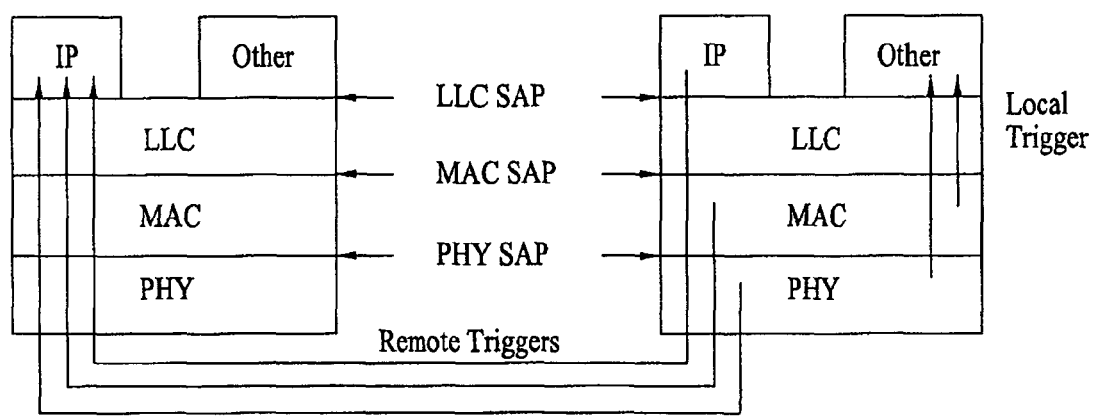
FIG. 4 illustrates an architecture of a trigger model.

FIG. 4 illustrates an architecture of a trigger model. The basic trigger events are Link_Up, Link_Down, Link_Going_Down, Link_Going_Up, Link_Event_Rollback, Link_Available, and Link_Parameter_Change.

Link_Up notification is delivered when a Layer 2 connection is established on the specified link interface and when other upper layers can send higher layer packets. All Layer 2 activities in establishing the link connectivity are expected to be completed at this point of time. Here, the source of the Link_Up event is the Local MAC and the Remote MAC.

Link_Down notification is delivered when a Layer 2 connection is broken on the specified link and when no more packets can be sent on the specific link. Here, the source of the Link_Down event is the Local MAC.

Link_Going_Down Up notification is delivered when a Layer 2 connection is expected (predicted) to go down (Link_Down) within a certain time interval. Link_Going Down event may be the indication to initiate handover procedures. Here, the source of the Link_Going_Down event is the Local MAC and the Remote MAC.

Link_Going_Up notification is delivered when a Layer 2 connection is expected (predicted) to go up (Link_Up) within a certain time interval. Moreover, the notification is used when excessive amount of time is expanded in initializing the network. Here, the source of the Link_Going_Up event is the Local MAC and the Remote MAC.

Link_Event_Rollback indication is used in conjunction with Link_Going_Down. That is, it combines Link_Going_Up and Link_Going_Down for use. More specifically, if the link is no longer expected to go up (Link_Up) or go down (Link_Down) in the specified time interval, then a Link_Event_Rollback message is sent to the Event destination. Here, the source of the Link_Event_Rollback event is the Local MAC and the Remote MAC.

Link_Available indicates a new available link. That is, Link_Available indicates the possibility that a new base station or an access point can provide better link quality than that of the access point of the current base station to which the mobile terminal is connected. Here, the source of the Link_Available event is the Local MAC and the Remote MAC.

Link_Parameters_Change indicates changes in link parameters when specified threshold levels are crossed. This may include link layer parameters such as speed of the link, Quality of Service (QoS), Bit Error Rate (BER), etc. The threshold level for each such parameter can be configured through a separate command to link layer. Here, the source of the Link_Parameters_Change event is the Local MAC and the Remote MAC.

Figure 5:
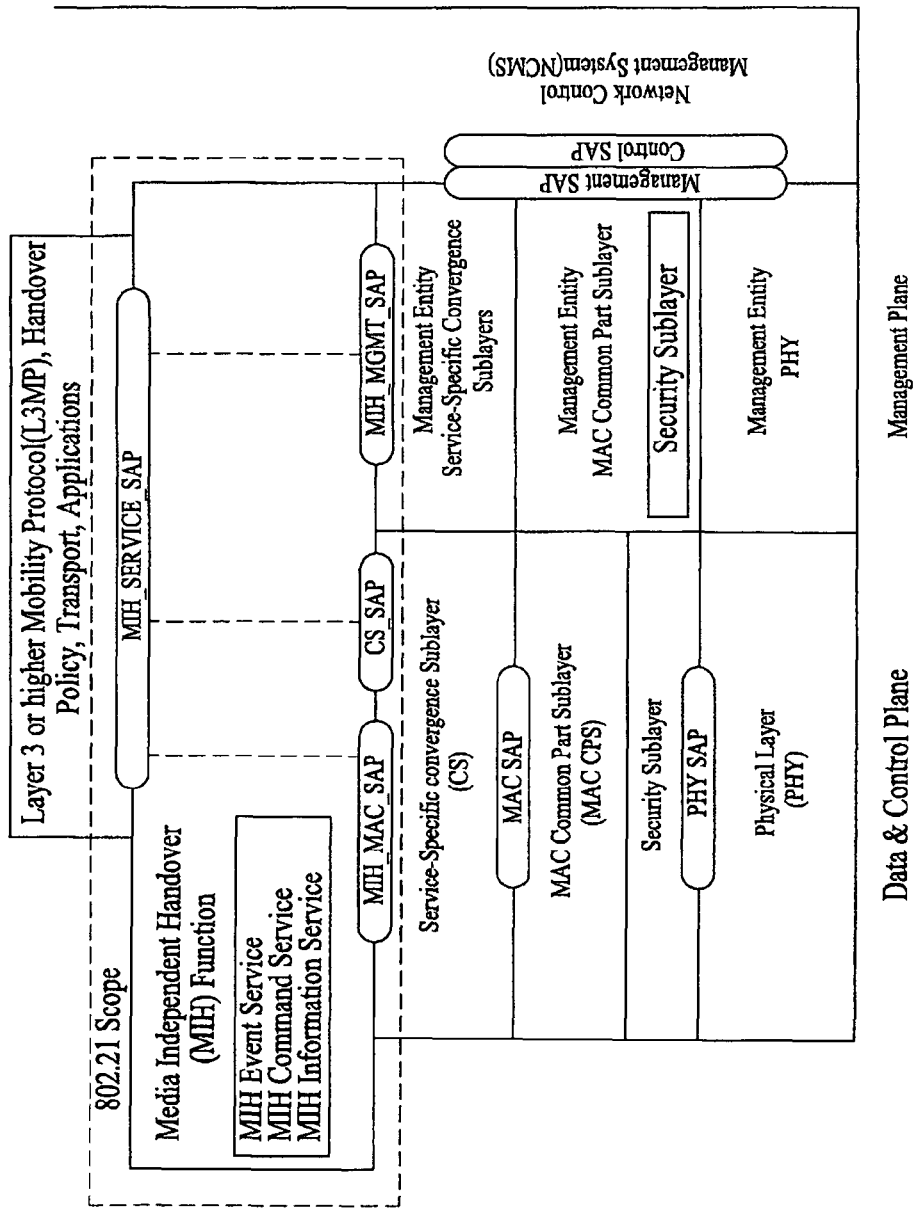
FIG. 5 is an example illustrating a diagram of a MIH protocol.

FIG. 5 is an example illustrating a diagram of a MIH protocol. In FIG. 5, a command is delivered from the upper management entity to the MIH via MIH_SERVICE_SAP. The primitives are delivered to a Network Control Management System (NCMS) via MIH_MGMT_SAP or MIH_ME_SAP.

Figure 6:
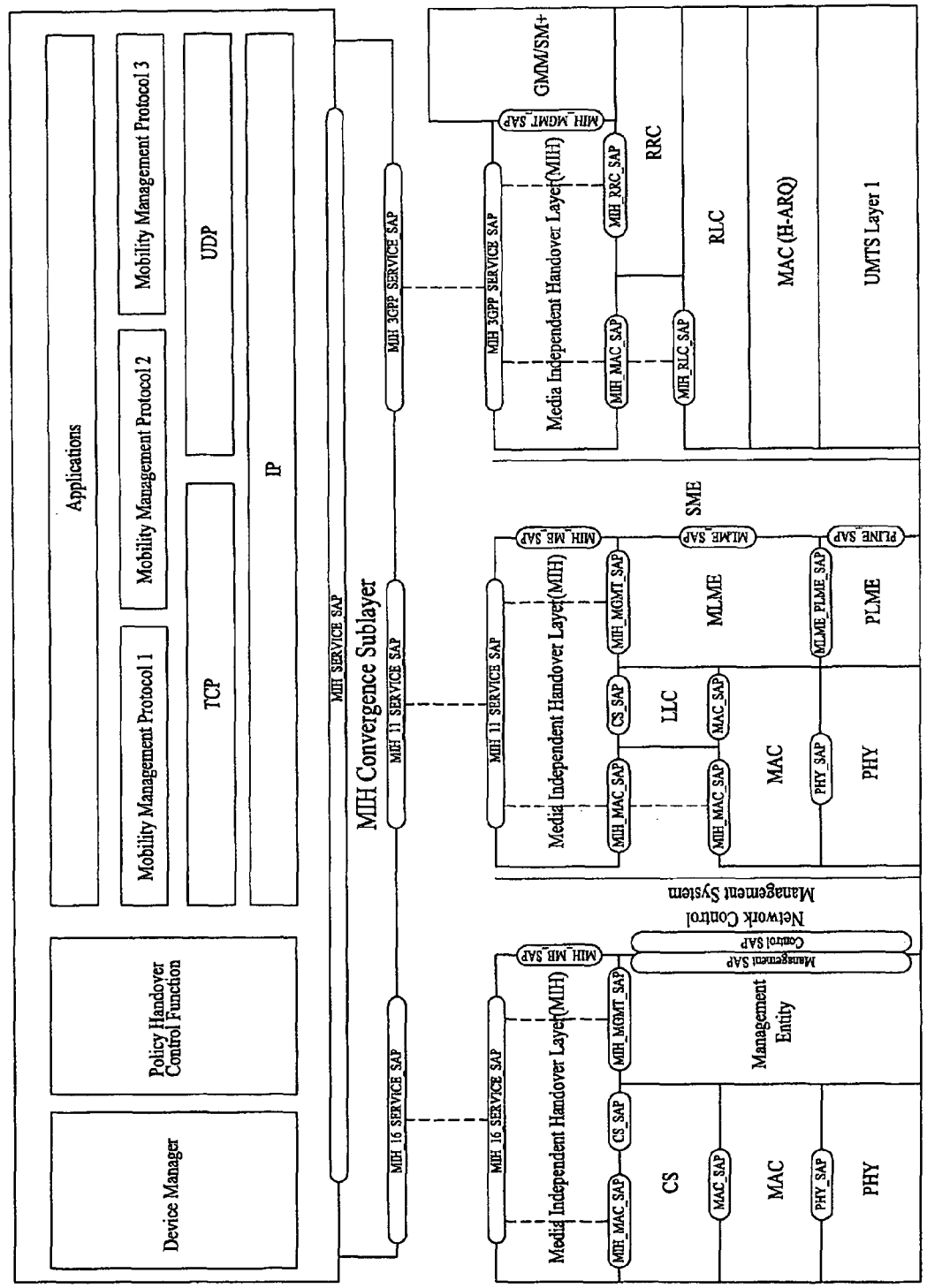
FIG. 6 is an exemplary diagram illustrating a protocol stack having a MIH Convergence Sublayer.

FIG. 6 is an exemplary diagram illustrating a protocol stack having a MIH Convergence Sublayer (CS). The MIH CS is configured across all interface types of a multi-stack provided to a terminal. Preferably, the object of the MIH CS is to act as a connection between a higher protocol and a lower MIH to facilitate equal application among different technologies regardless of the technologies' features dependent on media. Preferably, the technologies comprise at least one of a wireline broadband system, a wireless broadband system and a cellular system. Preferably, the broadband system comprises at least one of a wireless local area network and a wireless metropolitan area network. Preferably, the cellular system comprises at least one of WCDMA and a cdma2000.

Figure 7:
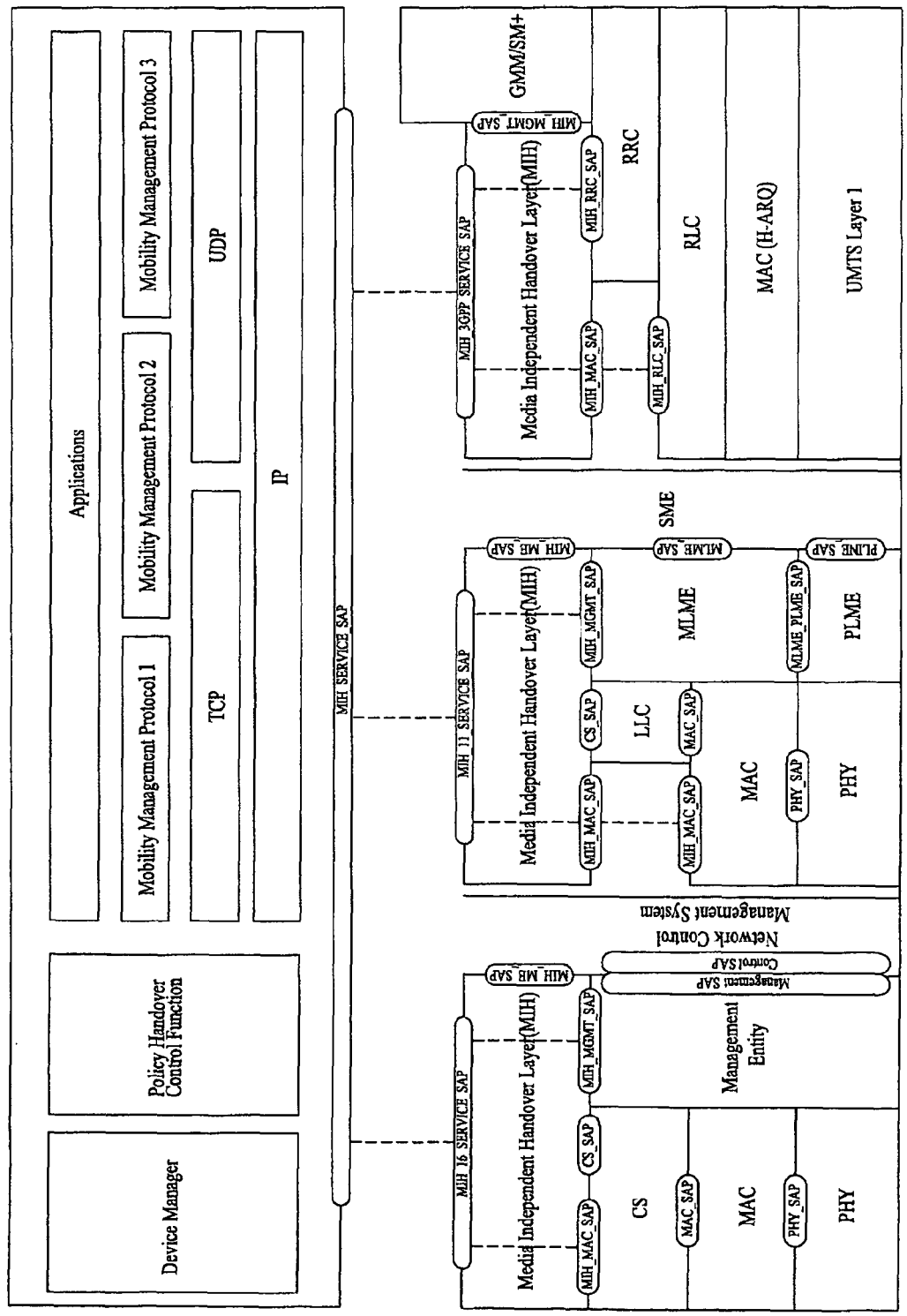
FIG. 7 illustrates an example of a protocol stack without a MIH Convergence Sublayer.

FIG. 7 illustrates an example of a protocol stack without a MIH CS.

The management entity according to the present invention refers to all the interfaces that interact with the NCMS. Moreover, the interface can be any logical management entity or physical management entity that can be located in the IP layer or the upper layer of the mobile terminal. Because the management entity communicates via the management SAP or the control SAP, the delivery can be expressed as if the primitives are sent directly from the NCMS. Furthermore, the upper management entity is an independent entity located in the upper portion of the MIH that can perform link selection function.

According to the present invention, the command and the primitive formats are as follows. More specifically, the format includes Setup_Link Command, Link_Setup.request, Link_Setup.confirm, and SetupLinkFail.indication. Setup Link can also be referred to as a Link Switch.

After the network selection procedure is performed by the upper management entity, Setup_Link command is used by the mobile terminal to deliver the selected link to the MIH. The MIH delivers the decision by the upper management entity regarding a target link with which the handover should be performed. In operation, the upper management entity can deliver a list of available links. In the list, the available links are arranged in order of preference. In selecting the target link, the MIH considers the handover policy as well as the preference. The following Table 1 depicts parameters of a Setup_Link Command.

TABLE 1

| Name | Type | Description |
| --- | --- | --- |
| CommandSource | Command Type | Source of Command |
| CommandDescription | Command Type | Target of Command |
| Interface ID | Enumeration | {802.3, 802.11, 802.16, 3GPP, 3GPP2} |
| MACMobile Terminal | MAC address | |

Link_Setup.request is a primitive used by the MIH to notify the MAC layer of the corresponding interface that it has been selected as the target link for handover and to command the MAC layer of the corresponding interface to establish link. As illustrated in Table 2, Link_Setup.request can include Source, Destination, Interface ID, and MACMobileTerminal parameters.

TABLE 2

| Name | Type | Valid range | Description |
| --- | --- | --- | --- |
| Source | | N/A | Source of Request message |
| Destination | | N/A | Target of Request message |
| Interface ID | Enumeration | 802.3 802.11 802.16 3GPP 3GPP2 | Select a link from a list of selected links |
| MACMobile Terminal | MAC Address | valid | MAC Address of corresponding MAC interface |

Link_Setup.request primitive can be generated when the MIH receives the Setup_Link command from the upper management entity. After receiving the primitive, the mobile terminal can establish the link with the MAC layer of the corresponding interface and can transmit Link_Setup.confirm primitive to the MIH. If Link_Setup.confirm primitive is not sent, the mobile terminal can send a different primitive, used in performing ranging operation, as substitute to Link_Setup.request primitive.

Link_Setup.confirm is a primitive and a response message to Link_Setup.request primitive used to provide whether link has been successfully established with the MIH. As illustrated in Table 3, Link_Setup.confirm primitive can include parameters related to Source, Destination, Interface ID, MACMobileTerminal, and Result. In operation, Link_Setup.confirm primitive can be generated with the corresponding link regardless whether the link is successfully established or not after link establishment is attempted. If the link is successfully established, the MIH can trigger Link_Going_Up to the upper management entity or to the higher layer. Alternatively, if the link fails, the MIH can request for an alternate link to the upper management entity.

TABLE 3

| Name | Type | Valid range | Description |
| --- | --- | --- | --- |
| Source | | N/A | Source of Confirm request |
| Destination | | N/A | Target Confirm message |
| Interface ID | Enumeration | 802.3 802.11 802.16 3GPP 3GPP2 | Link ID of successful link setup |
| MACMobile Terminal | MAC Address | valid | MAC Address of corresponding MAC interface |
| Result | Enumeration | Success Fail | Success/Failure of link establishment |

SetupLinkFail.indication is a primitive used to notify failure of link setup or switch from the MIH to the upper management entity. As shown in Table 4, SetupLinkFail.indication primitive can include parameters related to Source, Destination, Interface ID, MACMobileTerminal, and Reason. In operation, SetupLinkFail.indication primitive can be generated when the MIH receives a link setup failure indication from corresponding link via Link_Setup.confirm primitive. That is, the result value of Link_Setup.confirm primitive indicates failure. After receiving SetupLinkFail.indication primitive, the mobile terminal commands the MIH to perform scanning so as to search for and discover other links to establish link with.

TABLE 4

| Name | Type | Valid range | Description |
| --- | --- | --- | --- |
| Source | | N/A | Source of Confirm request |
| Destination | | N/A | Target Confirm message |
| Interface ID | Enumeration | 802.3 802.11 802.16 3GPP 3GPP2 | Link ID of successful link setup |
| MACMobile Terminal | MAC Address | valid | MAC Address of corresponding MAC interface |
| Reason | | | Reason for link establishment failure |

Provided below will be discussion related to a method of establishing link by the multi-mode mobile terminal for handover according to the present invention.

In the embodiment of the present invention, handover can take place in IEEE 802.11 and IEEE 802.16 interfaces; however, assumption is made that IEEE 802.16 interface is selected at the final selection stage as the interface to perform handover with. After the selection, the MAC layer of the multi-mode mobile terminal receives a setup link command or a link switch command from the upper management entity. Here below, a more detailed description will be provided regarding a successful link establishment procedure (e.g., performing link setup or switch) with the selected target link and also regarding a failed (unsuccessful) link establishment procedure with the selected target link.

Figure 8:
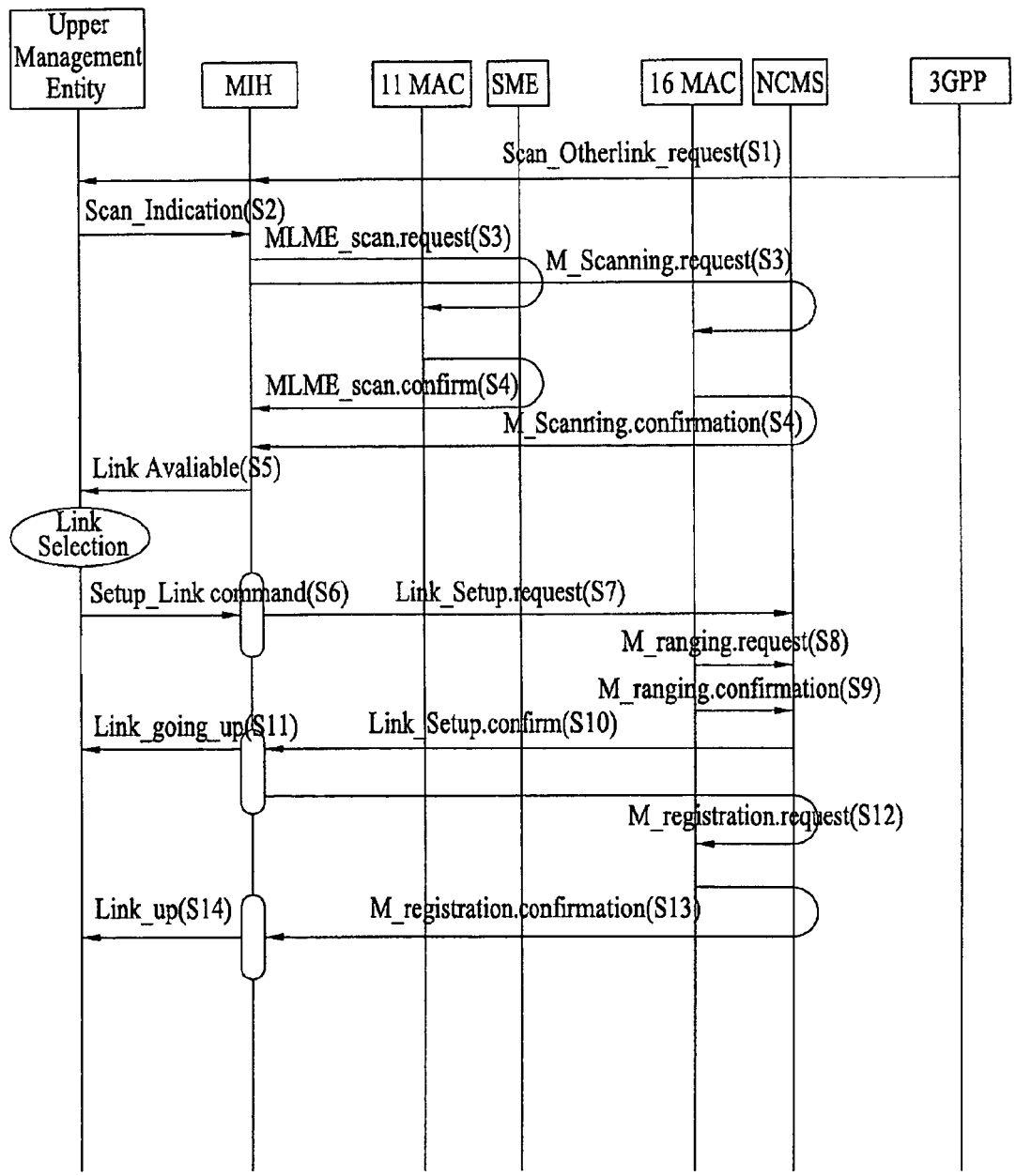
FIG. 8 is an exemplary diagram illustrating a successful link establishment procedure.

FIG. 8 is an exemplary diagram illustrating a successful link establishment procedure. More specifically, FIG. 8 relates to an environment where the currently established link quality changes or worsens. In this environment, the multi-mode mobile terminal of 3GPP can send Link_Going_Down primitive to the MIH to trigger action. This primitive notifies that a new link should be established. Subsequently, the upper management entity performs link selection procedure and commands link establishment with the MAC layer of the corresponding interface. In this example, the result of the link establishment is a success.

In the present embodiment, the multi-mode mobile terminal is operating in a 3GPP system. If the signal quality of the link decreases and other available base stations of the 3GPP system cannot be detected (or unavailable), Scan_Otherlink_request primitive can be sent to the MIH, and the MIH can send Scan_Otherlink_request primitive to the upper management entity (S1). Subsequently, the upper management entity can send Scan_Indication primitive to the MIH to command each interface system to detect for available links (S2).

The MIH can send a scanning request primitive (e.g., MLME_scan.request (IEEE 802.11) and M_scanning.request (IEEE 802.16)) to each lower management entity. The scanning request primitive is used to detect each link via IEEE 802.11 and IEEE 802.16 interfaces and measure link quality. Subsequently, each lower management entity can send corresponding primitive to its MAC layer (S3).

After receiving the scanning request primitive, each MAC layer can perform scanning and can send the results of scanning as a response primitive (e.g., MLME_scan.confirm or M_Scanning.confirmation) to the MIH (S4). Here, the response primitive can be transmitted via the NCMS or a Station Management Entity (SME) or alternatively, via a Service Access Point (SAP), identified independently from the MAC layer and the MIH layer.

Thereafter, the MIH can map the results of scan confirmation to a Link_Available primitive via the SAP of the upper management entity and can send the primitive to the upper management entity to notify that the corresponding link is the link with which to perform handover (S5). Furthermore, the upper management entity can choose the link corresponding to the IEEE802.16 interface from two available interfaces (links) and sends Setup_Link Command primitive to the MIH to notify of the link selection (S6).

After receiving the Setup_Link Command primitive, the MIH can send Link_Setup.request primitive to the NCMS associated with IEEE 802.16 (S7). Here, the Link_Setup.request primitive can be transmitted to the management entity via MIH_MGMT_SAP, as illustrated in FIG. 5. More specifically, the primitive can be sent via MIH_MGMT_SAP which is the SAP between the MIH and the management entity. Alternatively, the Link_Setup.request primitive can be transmitted to the management entity via MIH_ME_SAP, which is the SAP between the MIH and the NCMS, by first being sent to the NCMS and thereafter being sent to the management entity via the SAP between the NCMS and the management entity. The application of the embodiment of the present invention is not limited to Link_Setup.request primitive of IEEE 802.11 but can also use M_Ranging.request primitive of IEEE 802.16.

In a system having the MIH Convergence Sublayer (MIH CS), as illustrated in FIG. 6, the MIH CS can send Link_Setup.request primitive to the MIH associated with each specified link. When the MIH of each specified link sends Link_Setup.request primitive to the management entity of the specified link, primitives of the specified link (e.g., M_Ranging.request) can be used.

The NCMS of IEEE 802.16 can send M_Ranging.request primitive to the MAC layer to command a link to be established (S8). If the MIH CS exists, then the MIH of IEEE 802.16 can send M_Ranging.request primitive to the management entity directly or via the NCMS.

After M_Ranging.request is received, the IEEE 802.16 MAC layer can use M_Ranging.confirmation primitive to send the results of the ranging response message, received in response to the ranging request message sent to the base station, to the NCMS (S9). If the MIH CS exists, then M_Ranging.confirmation primitive can be sent to the MIH of IEEE 802.16.

The NCMS of IEEE 802.16 can deliver the result of the link establishment to the MIH via Link_Setup.confirm primitive (S10). In the system without the MIH CS, as illustrated in FIG. 7, M_Ranging.confirmation primitive can be sent in place of Link_Setup.confirm primitive. If the system includes the MIH CS, as is the case in FIG. 6, M_Ranging.confirmation primitive can be sent to the MIH of IEEE 802.16, and thereafter, the MIH of IEEE 802.16 can send Link_Setup.confirm primitive to the MIH CS.

If the result of Link_Setup.confirm primitive indicated as successful, an event can be triggered by sending Link_Going_Up primitive to the upper management entity or the higher layers (S11). Thereafter, the MIH can send M_registration.request primitive to IEEE 802.16 MAC layer via the NCMS to command initiation of network registration procedure (S12).

In addition, the MAC layer can perform the network registration procedure with the base station and then can deliver M_registration.confirm primitive to the MIH via the NCMS (S13). Then, the MIH can send Link_Up primitive to the upper management entity or the higher layers when result of M_registrations.confirm primitive is indicated as successful (S14).

The embodiment as relates to FIG. 8 describes the primitives being transmitted via MIH_ME_SAP (the SAP between the NCMS and the MIH), the primitives can be transmitted via the MIH_MGMT_SAP (the SAP between the management entity and the MIH). In addition, although the link establishment is described in the context of a broadband wireless access system (IEEE 802.16), the embodiments of the present invention can be applied to other systems (e.g., wireless LAN, cellular system, wired LAN).

Figure 9:
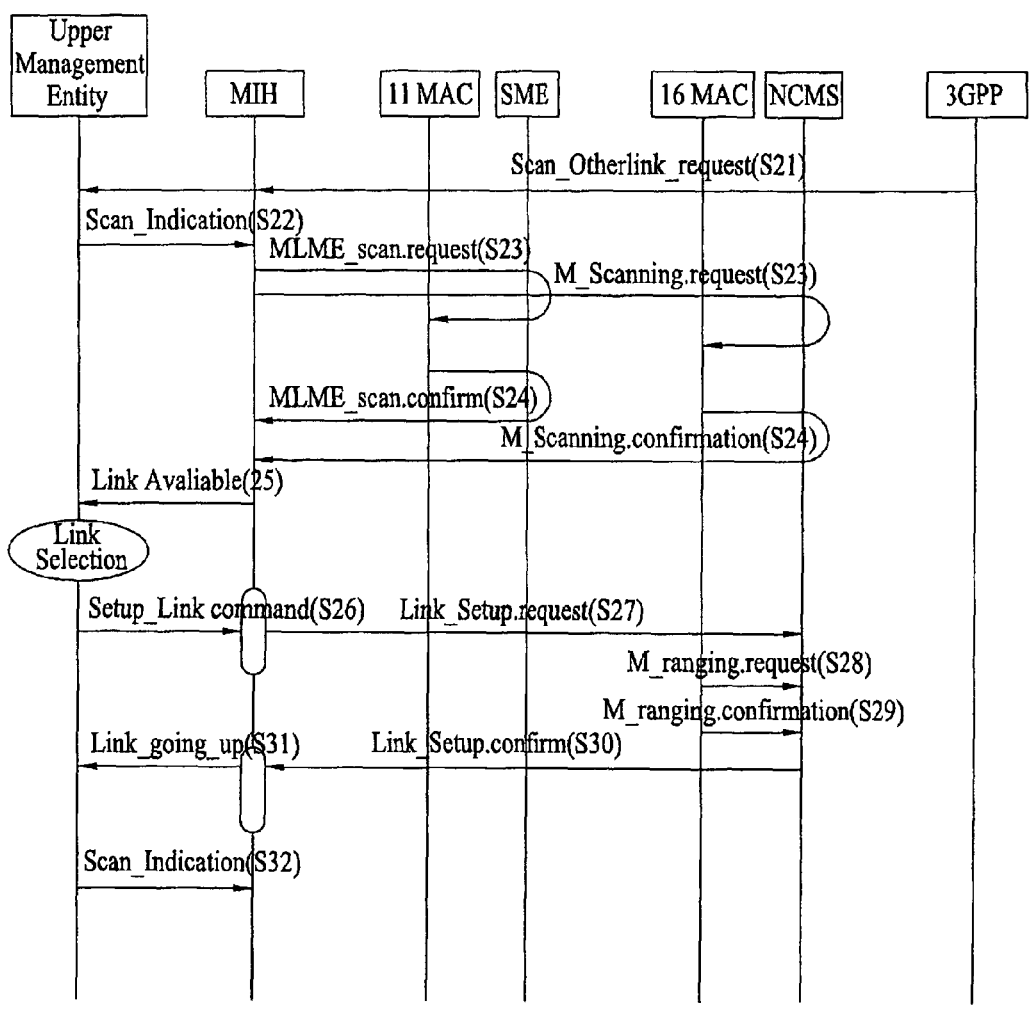
FIG. 9 is an exemplary diagram illustrating an unsuccessful link establishment procedure.

FIG. 9 is an exemplary diagram illustrating an unsuccessful link establishment procedure. More specifically, FIG. 8 relates to an environment where the currently established link quality changes or worsens. In this environment, the multi-mode mobile terminal of 3GPP can send Link_Going_Down primitive to the MIH to trigger action. This primitive notifies that a new link should be established. Subsequently, the upper management entity performs link selection procedure and commands link establishment with the MAC layer of the corresponding interface. However, different from the example of FIG. 8, the result of the link establishment is unsuccessful.

In the present embodiment, the multi-mode mobile terminal is operating in a 3GPP system. If the signal quality of the link decreases and other available base stations of the 3GPP system cannot be detected (or unavailable), Scan_Otherlink_request primitive can be sent to the MIH, and the MIH can send Scan_Otherlink_request primitive to the upper management entity (S21).

Subsequently, the upper management entity can send Scan_Indication primitive to the MIH to command each interface system to detect for available links (S22). The MIH can send a scanning request primitive (e.g., MLME_scan.request (IEEE 802.11) and M_scanning.request (IEEE 802.16)) to each lower management entity. The scanning request primitive is used to detect each link via IEEE 802.11 and IEEE 802.16 interfaces and measure link quality. Subsequently, each lower management entity can send corresponding primitive to its MAC layer (S23).

After receiving the scanning request primitive, each MAC layer can perform scanning and can send the results of scanning as a response primitive (e.g., MLME_scan.confirm or M_Scanning.confirmation) to the MIH (S24). Here, the response primitive can be transmitted via the NCMS or a Station Management Entity (SME) or alternatively, via a Service Access Point (SAP), identified independently from the MAC layer and the MIH layer.

Thereafter, the MIH can map the results of scan confirmation to a Link_Available primitive via the SAP of the upper management entity and can send the primitive to the upper management entity to notify that the corresponding link is the link with which to perform handover (S25). Furthermore, the upper management entity can choose the link corresponding to the IEEE802.16 interface from two available interfaces (links) and sends Setup_Link Command primitive to the MIH to notify of the link selection (S6).

After receiving the Setup_Link Command primitive, the MIH can send Link_Setup.request primitive to the NCMS associated with IEEE 802.16 (S27). Here, the Link_Setup.request primitive can be transmitted to the management entity via MIH_MGMT_SAP, as illustrated in FIG. 5. More specifically, the primitive can be sent via MIH_MGMT_SAP which is the SAP between the MIH and the management entity. Alternatively, the Link_Setup.request primitive can be transmitted to the management entity via MIH_ME_SAP, which is the SAP between the MIH and the NCMS, by first being sent to the NCMS and thereafter being sent to the management entity via the SAP between the NCMS and the management entity. The application of the embodiment of the present invention is not limited to Link_Setup.request primitive of IEEE 802.11 but can also use M_Ranging.request primitive of IEEE 802.16.

In a system having the MIH Convergence Sublayer (MIH CS), as illustrated in FIG. 6, the MIH CS can send Link_Setup.request primitive to the MIH associated with each specified link. When the MIH of each specified link sends Link_Setup.request primitive to the management entity of the specified link, primitives of the specified link (e.g., M_Ranging.request) can be used.

The NCMS of IEEE 802.16 can send M_Ranging.request primitive to the MAC layer to command a link to be established (S28). If the MIH CS exists, then the MIH of IEEE 802.16 can send M_Ranging.request primitive to the management entity directly or via the NCMS.

After M_Ranging.request is received, the IEEE 802.16 MAC layer can use M_Ranging.confirmation primitive to send the results of the ranging response message, received in response to the ranging request message sent to the base station, to the NCMS (S29). If the MIH CS exists, then M_Ranging.confirmation primitive can be sent to the MIH of IEEE 802.16.

The NCMS of IEEE 802.16 can deliver the result of the link establishment to the MIH via Link_Setup.confirm primitive (S30). In the system without the MIH CS, as illustrated in FIG. 7, M_Ranging.confirmation primitive can be sent in place of Link_Setup.confirm primitive. If the system includes the MIH CS, as is the case in FIG. 6, M_Ranging.confirmation primitive can be sent to the MIH of IEEE 802.16, and thereafter, the MIH of IEEE 802.16 can send Link_Setup.confirm primitive to the MIH CS.

In addition, if the result of Link_Setup_confirm primitive is indicated as failure, the MIH can send SetupLinkFail.indication primitive to the upper management entity, and thereafter, the upper management entity can retransmit Scan.Indication primitive to the MIH, repeating the procedure from the beginning.

The embodiment as relates to FIG. 8 describes the primitives being transmitted via MIH_ME_SAP (the SAP between the NCMS and the MIH), the primitives can be transmitted via the MIH_MGMT_SAP (the SAP between the management entity and the MIH). In addition, although the link establishment is described in the context of a broadband wireless access system (IEEE 802.16), the embodiments of the present invention can be applied to other systems (e.g., wireless LAN, cellular system, wired LAN).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a handover to at least a homogeneous or heterogeneous network in a multi-mode mobile terminal, the method comprising:

receiving a first message from an upper layer module of the multi-mode mobile terminal to command establishment of a connection to a first network at a media independent handover (MIH) module of the multi-mode mobile terminal, wherein the first message includes type information and address information used for indicating the first network to which the connection is to be established, and the MIH module is configured for converging information received from at least two network interface modules of the multi-mode mobile terminal associated with the at least a homogeneous or heterogeneous network into a unified presentation to be provided to the upper layer module;

sending a second message from the MIH module to a network interface module among the at least two network interface modules of the multi-mode mobile terminal that is associated with the first network, the second message sent based on the type information and the address information and in response to receipt of the first message at the MIH module, wherein the second message is used to establish the connection to the first network;

performing an operation for establishing the connection with an interface module of the first network in response to receipt of the second message at the network interface module associated with the first network;

transmitting a first confirmation message from the network interface module associated with the first network to the MIH module as a result of performing the operation for establishing the connection, the first confirmation message indicating a result of the operation to the MIH module, wherein the result of the operation includes at least success, fail, or reject; and transmitting a second confirmation message from the MIH module to the upper layer module in response to receipt of the first confirmation message at the MIH module, the second confirmation message indicating to the upper layer module that the result of the operation is fail when the result of the operation does not include success, wherein the second confirmation message includes type information and address information used for indicating a network related to the result of the operation.

2. The method of claim 1, wherein the MIH module communicates with the at least two network interface modules of the multi-mode mobile terminal through a network control management system.

3. The method of claim 2, wherein the network control management system supports a management function of the multi-mode mobile terminal and is a layer in an independent entity that is a management entity.

4. The method of claim 1, wherein the MIH module communicates with the at least two network interface modules of the multi-mode mobile terminal through a Medium Access Control (MAC) sublayer management entity.

5. The method of claim 1, wherein the at least two network interface modules comprise at least one of a wireless local area network interface module and a wireless metropolitan area network interface module.

6. The method of claim 1, wherein the at least two network interface modules comprise at least one of a WCDMA interface module and a cdma2000 interface module.

7. The method of claim 1, wherein the MIH module communicates with the at least two network interface modules through a management service access point and a control service access point.

8. The method of claim 1, wherein the MIH module communicates with the at least two network interface modules through one of a Medium Access Control (MAC) sublayer management entity and a physical layer management entity.

9. The method of claim 1, wherein the operation includes a handover operation.

10. The method of claim 1, wherein the second message includes an original primitive for one of the at least two network interface modules associated with the first network.

11. A method of performing a handover to at least a homogeneous or heterogeneous network in a multi-mode mobile terminal, the method comprising:
  receiving a command from an upper layer module to request establishment of a connection to a first network at a media independent handover (MIH) module, wherein the command includes a list of both type information and address information used for indicating at least the first network to which the connection is to be established, and the MIH module is configured for converging information received from at least two network interface modules of the multi-mode mobile terminal associated with the at least a homogeneous or heterogeneous network into a unified presentation to be provided to the upper layer module;
  transmitting a message from the MIH module to the at least two network interface modules based on the type information and the address information in response to receipt of the command, wherein the message is used to establish the connection to the first network;
  receiving a first confirmation message in the MIH module from the at least two network interface modules as a result of performing an operation for establishing the connection, the first confirmation message indicating a result of the operation, wherein the result of the operation includes at least success, fail, or reject; and
  transmitting a second confirmation message from the MIH module to the upper layer module in response to receipt of the first confirmation message at the MIH module, the second confirmation message indicating to the upper layer module that the result of the operation is fail when the result of the operation does not include success, wherein the second confirmation message includes a list of both type information and address information used for indicating at least a network related with the result of the operation.

12. The method of claim 11, further comprising transmitting a message from the MIH module to the at least two network interface modules for indicating a first time period associated with establishing the connection with the first network.

13. The method of claim 11, further comprising:
  receiving a command in the MIH module from the upper layer module for scanning available links.

14. The method of claim 11, wherein the at least two network interface modules comprise at least one of a wireless local area network interface module and a wireless metropolitan area network interface module.

15. The method of claim 11, wherein the at least two network interface modules comprise at least one of a WCDMA interface module and a cdma2000 interface module.

16. The method of claim 11, wherein the MIH module communicates with the at least two network interface modules through a management service access point and a control service access point.

17. The method of claim 11, wherein the MIH module communicates with the at least two network interface modules through one of a Medium Access Control (MAC) sublayer management entity and a physical layer management entity.

18. The method of claim 11, wherein the operation includes a handover operation.

19. The method of claim 11, wherein the message includes an original primitive for the network interface module associated with the first network.

20. A multi-mode mobile terminal for of performing a handover to at least a homogeneous or heterogeneous network, the multi-mode mobile terminal comprising:
  a media independent handover (MIH) module configured to converge information received from at least two network interface modules of the multi-mode mobile terminal associated with the at least a homogeneous or heterogeneous network into a unified presentation to be provided to an upper layer module of the multi-mode mobile terminal,
  wherein the MIH module receives a first message from the upper layer module to command establishment of a connection to a first network, the first message including type information and address information used for indicating the first network to which the connection is to be established,
  wherein the MIH module sends a second message to a network interface module among the at least two network interface modules of the multi-mode mobile terminal that is associated with the first network, the second message sent based on the type information and the address information in response to the receipt of the first message, wherein the second message is used to establish the connection to the first network, wherein the MIH module receives a first confirmation message from the network interface module associated with the first network as a result of performing an operation for establishing the connection with an interface module of the first network, the first confirmation message indicating a result of the operation, wherein the result of the operation includes at least success, fail, or reject, wherein the MH module sends a second confirmation message to the upper layer module in response to receipt of the first confirmation message at the MIH module, the second confirmation message indicating to the upper layer module that the result of the operation is fail when the result of the operation does not include success, wherein the second confirmation message includes type information and address information used for indicating a network related with the result of the operation, wherein the operation for establishing the connection is performed in response to the receipt of the second message at the network interface module associated with the first network.

21. The multi-mode mobile terminal of claim 20, wherein the address information includes a Medium Access Control (MAC) address.

22. The multi-mode mobile terminal of claim 20, wherein the at least two network interface modules comprise at least one of a wireless local area network interface module and a wireless metropolitan area network interface module.

23. The multi-mode mobile terminal of claim 20, wherein the at least two network interface modules comprise at least one of a WCDMA interface module and a cdma2000 interface module.

* * * * *